US011302170B1

(12) United States Patent
Salasoo et al.

(10) Patent No.: US 11,302,170 B1
(45) Date of Patent: Apr. 12, 2022

(54) SYSTEMS AND METHODS FOR MAPPING HAZARDS USING WEARABLE SENSORS

(71) Applicant: General Electric Company, Schenectady, NY (US)

(72) Inventors: Lembit Salasoo, Schenectady, NY (US); Cheng-Po Chen, Niskayuna, NY (US); S M Shajedul Hasan, Rexford, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 16/952,393

(22) Filed: Nov. 19, 2020

(51) Int. Cl.
*G01C 21/00* (2006.01)
*G08B 21/04* (2006.01)
*G06F 1/16* (2006.01)

(52) U.S. Cl.
CPC ....... *G08B 21/0453* (2013.01); *G01C 21/005* (2013.01); *G06F 1/163* (2013.01)

(58) Field of Classification Search
None
See application file for complete search history.

(56) References Cited

U.S. PATENT DOCUMENTS

| 7,263,379 | B1* | 8/2007 | Parkulo | G08B 21/02 340/501 |
| 7,688,199 | B2 | 3/2010 | Zhang et al. | |
| 7,868,811 | B1 | 1/2011 | Woodell et al. | |
| 9,424,726 | B2* | 8/2016 | Armitage | G08B 25/009 |
| 9,619,986 | B2* | 4/2017 | Seol | G08B 21/14 |
| 9,770,382 | B1* | 9/2017 | Ellis | A61H 3/061 |
| 9,792,798 | B2 | 10/2017 | Jobin et al. | |
| 9,814,278 | B2* | 11/2017 | Chung | A42B 3/046 |
| 9,978,251 | B2* | 5/2018 | Gonia | G08B 21/14 |
| 9,997,058 | B2 | 6/2018 | Sloo et al. | |
| 10,186,093 | B2* | 1/2019 | Pauli | G07C 5/0825 |
| 10,395,445 | B2* | 8/2019 | Pauli | G01G 19/08 |
| 10,453,322 | B2* | 10/2019 | Kaindl | B60Q 1/2673 |
| 10,514,264 | B2* | 12/2019 | Correnti | G01C 21/3647 |

(Continued)

FOREIGN PATENT DOCUMENTS

CN 103456136 B 5/2017

OTHER PUBLICATIONS

Chung et al., "Validation of Spatial Prediction Models for Landslide Hazard Mapping," dated Nov. 2003, Natural Hazards vol. 30, issue No. 3, pp. 451-472.

*Primary Examiner* — Muhammad Adnan
(74) *Attorney, Agent, or Firm* — Armstrong Teasdale LLP

(57) ABSTRACT

A system for detecting and mapping hazards is provided. The system includes at least one sensor unit including a plurality of sensors and a locating device and a hazard mapping (HM) computing device. The HM computing device includes at least one processor configured to receive, from the plurality of sensors, a plurality of sensor measurements, receive, from the locating device, a plurality of sensor locations, determine, based on the sensor locations, a location of the sensor unit during each sensor measurement of the plurality of sensor measurements, identify, for each determined location, a first location identifier of a first plurality of location identifiers, compare each sensor measurement corresponding to the first location identifier to a reference sensor level of the identified first location identifier, and determine that an alert condition is present based on the comparison.

17 Claims, 4 Drawing Sheets

(56) References Cited

U.S. PATENT DOCUMENTS

| | | | | |
|---|---|---|---|---|
| 10,521,625 | B2 * | 12/2019 | Takeshima | G08B 21/02 |
| 10,616,396 | B2 * | 4/2020 | Gersten | H04W 4/023 |
| 10,661,146 | B2 * | 5/2020 | Hausman | H04W 4/021 |
| 10,798,282 | B2 * | 10/2020 | Kraeling | G08B 25/00 |
| 10,810,845 | B2 * | 10/2020 | Coles | G08B 5/38 |
| 10,852,154 | B1 * | 12/2020 | Knas | G01C 21/3661 |
| 10,885,758 | B2 * | 1/2021 | Johnson | G06K 9/00362 |
| 10,997,832 | B1 * | 5/2021 | Vadayadiyil Raveendran | G02B 27/017 |
| 2008/0001735 | A1 * | 1/2008 | Tran | G16H 80/00 340/539.22 |
| 2009/0322523 | A1 | 12/2009 | McKenna et al. | |
| 2015/0316383 | A1 * | 11/2015 | Donikian | G01C 22/006 701/408 |
| 2017/0140631 | A1 * | 5/2017 | Pietrocola | A61B 5/00 |
| 2017/0358194 | A1 | 12/2017 | Glatfelter et al. | |
| 2018/0053394 | A1 * | 2/2018 | Gersten | G08B 17/08 |
| 2018/0091989 | A1 * | 3/2018 | Baroudi | H04W 4/70 |
| 2019/0073618 | A1 | 3/2019 | Kanukurthy et al. | |
| 2019/0302719 | A1 * | 10/2019 | Aljuaid | G05B 19/048 |

\* cited by examiner

2

SYSTEMS AND METHODS FOR MAPPING HAZARDS USING WEARABLE SENSORS

BACKGROUND

The field of the invention relates generally to worksite monitoring systems, and more particularly, to systems and methods for mapping hazards in a worksite or other location using wearable sensors.

Worksites and other locations may include various hazards that may not be visible or readily apparent to individuals at the site, but may be detected through the use of sensors. However, a single sensor measurement is generally insufficient to determine whether hazardous conditions are present or the source of the hazard. For example, if a portion of a power system is damaged or is malfunctioning, hot or electrically charged objects may be present in or near the system, which may pose a danger of burns, shock, or electrocution. Such charged objects cause an electric field to be present. Current sensors can detect the presence of an electric field by sensing an electric field magnitude at a particular location. However, a single measurement of an electric field magnitude is generally insufficient to determine the source of the electric field, and accordingly, the potential danger. Other hazards such as, for example, overheating devices or dangerous gases, may similarly be unable to be detected using an individual sensor measurement.

An improved system for detecting and mapping hazards in a worksite is therefore desirable.

BRIEF DESCRIPTION

In one aspect, a system for detecting and mapping hazards is provided. The system includes at least one sensor unit including a plurality of sensors and a locating device and a hazard mapping (HM) computing device configured to communicate with the at least one sensor unit. The HM computing device includes at least one memory device configured to store a first reference map. The first reference map includes a first plurality of location identifiers and at least one reference sensor level associated with each location identifier. The HM computing device further includes at least one processor. The at least one processor is configured to receive, from the plurality of sensors, a plurality of sensor measurements. The at least one processor is further configured to receive, from the locating device, a plurality of sensor locations. The at least one processor is further configured to determine, based on the sensor locations, a location of the sensor unit during each sensor measurement of the plurality of sensor measurements. The at least one processor is further configured to identify, for each determined location, a first location identifier of the first plurality of location identifiers. The at least one processor is further configured to compare each sensor corresponding to the first location identifier to the reference sensor level of the identified first location identifier. The at least one processor is further configured to determine that an alert condition is present based on the comparison.

In another aspect, a method for detecting and mapping hazards is provided. The method is performed by a hazard mapping (HM) computing device including at least one processor coupled to at least one memory device and at least one sensor unit including a plurality of sensors and a locating device. The at least one memory device is configured to store a first reference map. The first reference map includes a first plurality of location identifiers and at least one reference sensor level associated with each location identifier. The method includes receiving, by the at least one processor from the plurality of sensors, a plurality of sensor measurements. The method further includes receiving, by the at least one processor from the locating device, a plurality of sensor locations. The method further includes determining, by the at least one processor, based on the sensor locations, a location of the sensor unit during each sensor measurement of the plurality of sensor measurements. The method further includes identifying, by the at least one processor, for each determined location, a first location identifier of the first plurality of location identifiers. The method further includes comparing, by the at least one processor, each sensor measurement corresponding to the first location identifier to the reference sensor level of the identified first location identifier. The method further includes determining, by the at least one processor, that an alert condition is present based on the comparison.

In another aspect, a hazard mapping (HM) computing device is provided. The HM computing device includes at least one processor coupled to at least one memory device. The HM computing device is configured to communicate with at least one sensor unit including a plurality of sensors and a locating device. The at least one memory device is configured to store a first reference map. The first reference map includes a first plurality of location identifiers and at least one reference sensor level associated with each location identifier. The at least one processor is configured to receive, from the plurality of sensors, a plurality of sensor measurements. The at least one processor is further configured to receive, from the locating device, a plurality of sensor locations. The at least one processor is further configured to determine, based on the sensor locations, a location of the sensor unit during each sensor measurement of the plurality of sensor measurements. The at least one processor is further configured to identify, for each determined location, a first location identifier of the first plurality of location identifiers. The at least one processor is further configured to compare each sensor measurement corresponding to the first location identifier to the reference sensor level of the identified first location identifier. The at least one processor is further configured to determine that an alert condition is present based on the comparison.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
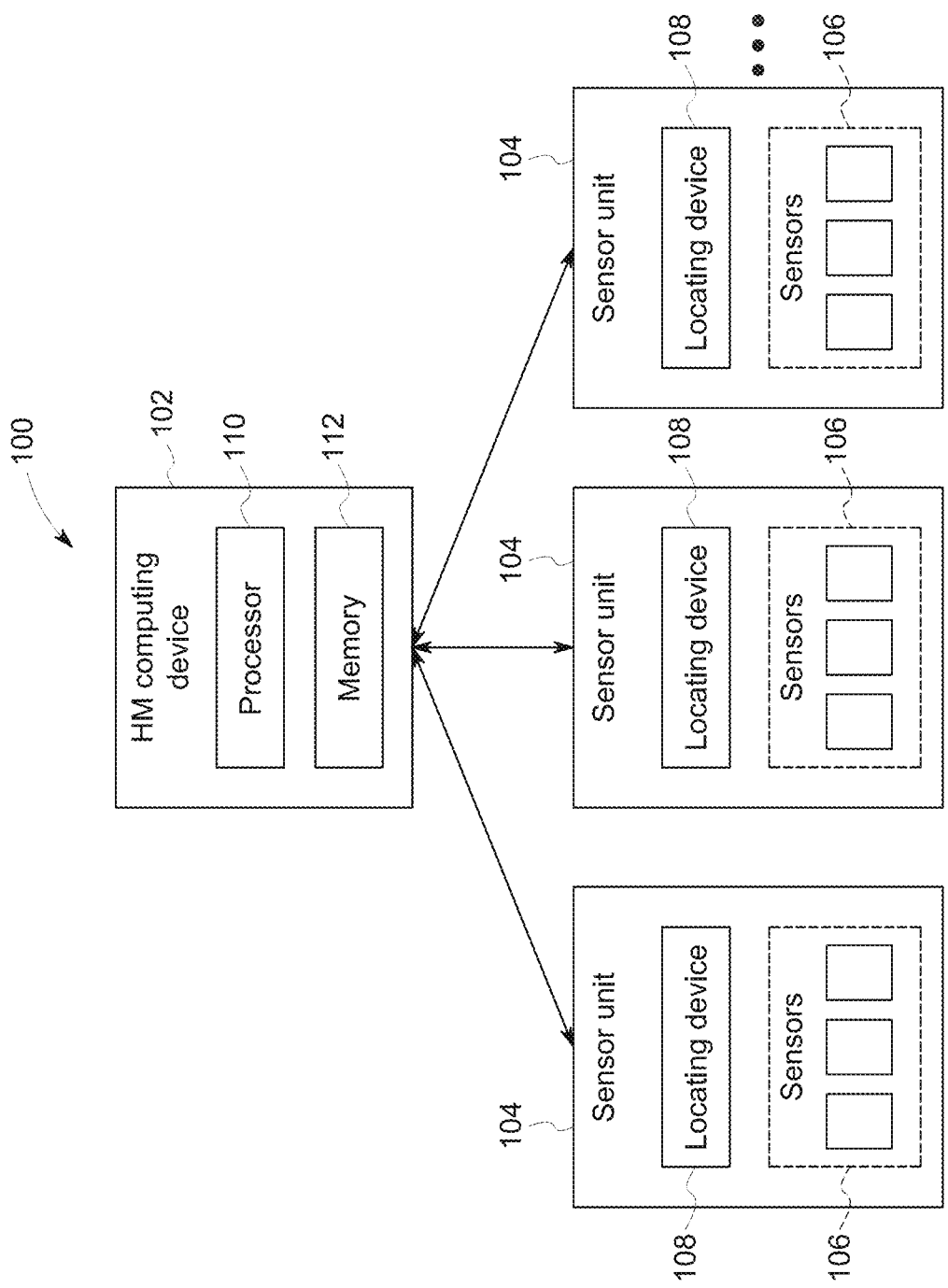
FIG. 1 is a block diagram of an exemplary hazard mapping (HM) system.

In the following specification and the claims, reference will be made to a number of terms, which shall be defined to have the following meanings.

The singular forms "a", "an", and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The embodiments described herein include a system for detecting and mapping hazards including at least one sensor unit including a plurality of sensors and a locating device, and a hazard mapping (HM) computing device configured to communicate with the at least one sensor unit. The HM computing device includes at least one memory device configured to store a first reference map. The first reference map includes a first plurality of location identifiers and at least one reference sensor level associated with each location identifier. The HM computing device further includes at least one processor. The at least one processor is configured to receive, from the plurality of sensors, a plurality of sensor measurements. The at least one processor is further configured to receive, from the locating device, a plurality of sensor locations. The at least one processor is further configured to determine, based on the sensor locations, a location of the sensor unit during each sensor measurement of the plurality of sensor measurements. The at least one processor is further configured to identify, for each determined location, a first location identifier of the first plurality of location identifiers. The at least one processor is further configured to compare each sensor measurement corresponding to the first location identifier to the reference sensor level of the identified first location identifier. The at least one processor is further configured to determine that an alert condition is present based on the comparison.

While the system is described herein as being implemented in a worksite, in some embodiments, the system is implemented in other environments such as, for example, institutional environments (e.g., eldercare facilities, hospital, schools, or dormitories), recreational environments (e.g., gyms, walking and hiking trails, or swimming pools), sporting environments (e.g., training environments or game environments), commercial environments (e.g., offices, shopping centers and stores, airplanes, cruise ships, or ferries), in-home environments, military environments, livestock and pet environments, and other environments.

FIG. 1 is a block diagram of an exemplary hazard mapping (HM) system 100. HM system 100 includes an HM computing device 102 and one or more sensor units 104. HM computing device 102 is a central server that communicates with sensor units 104 situated, for example, throughout a worksite. As described below, HM computing device 102 uses data from the distributed sensor units 104 to detect hazards and identify hazard sources in the worksite. In some embodiments, HM computing device 102 and sensor units 104 communicate wirelessly, for example, using a wireless local area network (WLAN) or cellular connection, or through a direct wireless connection such as, for example, a Bluetooth or ZigBee connection. In some embodiments, HA computing device is configured to communicate with sensor units 104 using a personal internet-of-things (PIoT) standard, such a $3^{rd}$ Generation Partnership Project (3GPP) standard that defines a protocol for communication between IoT devices (e.g., sensor units 104). In some such embodiments, the PIoT standard is a proprietary standard developed specifically for HM system 100 or similar systems.

Sensor units 104 include one or more sensors 106 and a locating device 108. Sensors 106 include one or more of various types of sensors such as, for example, cameras, gas sensors, temperature sensors, humidity sensors, voltage sensors, electric field sensors, biometric sensors, environmental sensors, sound sensors, pressure sensors, or other sensors that collect data corresponding to an environment of the location of sensor unit 104. Sensor units 104 are configured to transmit the data collected by sensors 106 (sometimes referred to herein as "sensor measurements") to HM computing device 102.

Locating device 108 is configured to determine a location of sensor unit 104 (sometimes referred to herein as a "sensor location") and an orientation of sensor unit 104. In some embodiments, locating device 108 is configured to use a radiolocation system such as, for example, a global positioning system (GPS), to triangulate a location of sensor unit 104 within the worksite. In some embodiments, locating device 108 includes a positional sensor that generates a pointing vector of sensor unit 104. The positional sensor includes a gyroscope or other device that enables locating device 108 to determine an orientation of sensor unit 104 such as, for example, a horizontal or vertical direction that sensor unit 104 is facing. In some embodiments, locating device 108 uses multiple technologies to determine the location of sensor unit 104. For example, GPS may be used for outdoor scenes, and ultra-wide-band technology may be used for accurate three dimensional positioning indoors. In some embodiments, locating device 108 utilizes additional sensors to determine a location of sensor unit 104. For example, locating device 108 may use a pressor sensor to determine an elevation of sensor unit 104, and a corresponding story of a floor of the worksite based on the elevation. Further, locating device 108 may include or be in communication with a proximity sensor that detects other sensor units 104 that are within a certain proximity of locating devices 108 or a relative proximity between locating devices 108 and the other sensor units 104, enabling nearby workers to be identified.

In some embodiments, at least some of sensor units 104 are wearable devices. For example, in some such embodiments, sensor units 104 are integrated into helmets or other personal protective equipment (PPE) worn by workers in the worksite, with sensors 106 being attached to or integrated into the wearable device. In such embodiments, each sensor unit 104 can include multiple sensors 106 of a given sensor type, which may increase an amount of data that can be collected by sensor unit 104 at a given time and may enable data collected by a single sensor unit 104 to determine, for example, a direction of a hazard source with respect to the sensor unit 104. Further, the wearable devices may include additional components such as, for example, loudspeakers and display screens, which can be used to generate and display alerts regarding hazards to the wearer.

As described in further detail below, utilizing a greater number of sensors 106 that are, for example, located in a greater number of different positions increases the resolution at which HM computing device 102 can generate a hazard map and the accuracy with which HM computing device 102 identify the locations of potential hazards. Accordingly, in some embodiments, HM system 100 includes many sensor units 104 that are carried about the worksite by many different workers, enabling many field measurements to be taken relatively quickly throughout the worksite. While sensor units 104 are described herein as being wearable devices, in some embodiments, some or all of sensor units 104 are stationary installations. For example, in some embodiments, the worksite may include an array of sensors 106 installed throughout the worksite, each sensor 106 having a known location or coordinates.

HM computing device 102 includes a processor 110 and a memory device 112, which in some embodiments perform some or all of the functions described with respect to HM computing device 102. Memory device 112 is configured to store a reference map corresponding to a location monitored by HM system 100. The reference map includes a plurality of location identifiers that correspond to each of a plurality of locations of the worksite. In some embodiments, the location identifiers are location bins, or data structures defined to correspond to a certain area or space within the worksite. For example, in some embodiments, the reference map is an array of location bins that correspond to a specific two dimensional area or three dimensional space of the worksite. Memory device 112 is further configured to store, for each location bin, one or more reference sensor levels. Each reference sensor level of a given location bin corresponds to a different measure or sensor type, and may be an average or expected sensor value for the measurements taken within the corresponding location bin. In some embodiments, the reference sensor levels are computed by HM computing device 102, for example, by determining an average sensor value of a plurality of historical sensor values over time for a given parameter. Accordingly, as described below, HM computing device 102 can compare current sensor measurements to the reference sensor levels to determine that conditions in a given location of the worksite have changed and/or that an alert condition is present.

In some embodiments, memory device 112 is configured to store a plurality of different reference maps. In such embodiments, each reference map corresponds to a different hazard condition and includes reference sensor levels for the corresponding hazard condition. For example, one reference map may include reference sensor levels expected for a condition where no hazard is present, while other reference maps may include reference sensor levels expected when certain predicted hazards are present. Accordingly, HM computing device 102 can compare current sensor measurements to the plurality of reference maps to determine a current hazard condition of the worksite.

HM computing device 102 is configured to receive, from sensors 106, a plurality of sensor measurements. In some embodiments, HM computing device 102 receives the sensor measurements simultaneously or continuously, intermittently, or periodically over a set period of time. Accordingly, a single worker wearing sensor unit 104 can capture a plurality of different sensor measurements, each from a different location within the worksite.

HM computing device 102 is further configured to receive, from locating devices 108, a plurality of sensor locations. HM computing device 102 is further configured to determine, based on the received sensor locations, a location of sensor unit 104 during each sensor measurement. For example, in some embodiments, each measurement may be transmitted to HM computing device 102 from sensor unit 104 in a data packet that includes the sensor measurement values for each measured parameter, a location of sensor unit 104 during the measurement, and other data such as, for example, an orientation of each sensor 106 during the measurement, and a timestamp or an identifier corresponding to the sensor unit 104 and/or sensor 106 from which the measurement originates. In some embodiments, when a sensor measurement is received, HM computing device 102 is further configured to interpolate a location corresponding to the sensor measurement based on one or more sensor location measurements received, for example, close to a time instant that the sensor measurement was received. In some embodiments, when a location measurement is received, HM computing device 102 is further configured to interpolate a sensor value corresponding to the location measurement based on one or more sensor value measurements received, for example, close to a location from which the location measurement was received. In some embodiments, HM computing device 102 is further configured to interpolate both a sensor value and a sensor location for another set of time instants. In some embodiments, HM computing device 102 is further configured to interpolate both a sensor value and a time instant for another set of locations.

HM computing device 102 is further configured to identify, for each sensor location, a location identifier. For example, in embodiments in which the reference map is broken down into an array of location bins corresponding to areas of the worksite, HM computing device 102 associates each sensor location with a location bin corresponding to a range of area of the worksite in which the sensor location falls.

HM computing device 102 is further configured to compare each sensor measurement of each sensor location to the reference sensor level of an identified location identifier. For example, HM computing device may compare a temperature measurement taken for a location to a reference temperature level corresponding to that location, an electric field magnitude measurement taken for a location to a reference electric field magnitude level corresponding to that location, and so on with respect to other parameters.

HM computing device 102 is further configured to determine that an alert condition is present based on the comparison. For example, in some embodiments, HM computing device 102 is configured to determine that the alert condition is present if a difference between one of the sensor measurements and the corresponding reference level is greater than a threshold difference. Additionally or alternatively, in embodiments where memory device 112 stores a plurality of reference maps with corresponding hazard conditions, HM computing device 102 compares each of the sensor measurements to the corresponding reference sensor levels for each map and identifies a reference map having the closest reference sensor levels to the current sensor conditions or a reference map having reference sensor levels within a threshold difference based on the comparison. HM computing device 102 can then determine a current hazard condition based on the identified reference map. In such embodiments, if the current sensor measurements do not correspond to any of the plurality of reference maps, HM computing device 102 determines that a new or unknown hazard condition is present.

In some embodiments, HM computing device 102 uses the sensor measurements and corresponding locations as data inputs to generate one or more maps of sensor measurements and corresponding hazard conditions throughout the worksite. For example, a regression analysis such as polynomial regression may be used to interpolate data points corresponding to sensor values at location identifiers that do not have a current corresponding sensor measurement from one of sensor units 104. Additionally or alternatively, HM computing device 102 may use other algorithms to generate a map of measured and interpolated sensor values throughout the worksite. In some embodiments, HM computing device 102 is in communication with, for example, a display screen, through which HM computing device 102 can display the generated map and the identified hazard conditions, for example, as an overlay on the generated map.

In some embodiments, HM computing device 102 is configured to retrieve data regarding the worksite such as, for example, elements of the worksite and their respective locations. Using this data, HM computing device 102 can identify specific elements of the worksite that are potential sources of hazards and that are potentially dangerous or malfunctioning. In some such embodiments, HM computing device 102 identifies workers that are proximate to the potential danger, for example, using data from sensor units 104 being worn by the workers. In such embodiments, HM computing device 102 further can transmit warning notifications to the identified workers, such as a location of the hazard source when the hazard may not be apparent or visible to the worker. For example, in some embodiments, the sensor units 104 include components, such a loudspeaker, that vibrate or emit a sound or light in response to the warning notification. In some embodiments, HM computing device 102 transmits, for example, an email, text message, or other notification message to a smart phone associated with the identified workers. In some embodiments, such notifications may include a direction and distance of the hazard with respect to each worker and/or directions for the worker to avoid and/or escape from the hazard.

Figure 2:
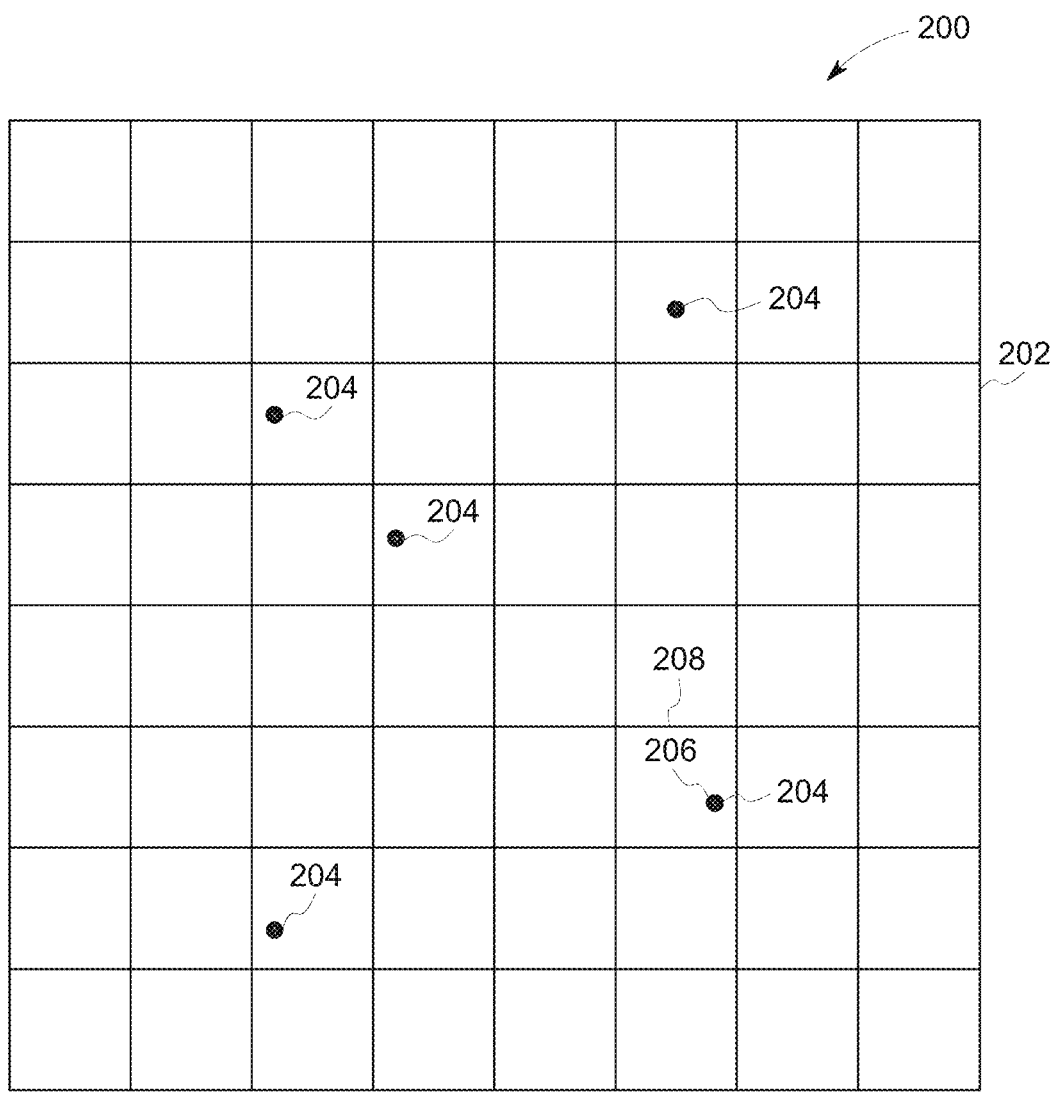
FIG. 2 is an exemplary reference map used by the HM system shown in FIG. 1.

FIG. 2 is an exemplary hazard map 200. In some embodiments, hazard map 200 is generated by HM system 100 (shown in FIG. 1), for example, using HM computing device 102. Hazard map 200 includes a plurality of location bins 202. Each location bin 202 corresponds to a specific area of a worksite. Each location bin 202 is associated with data such as, for example, one or more reference sensor values. For example, in some embodiments, each location bin 202 is associated with a first set of reference sensor levels that correspond to expected sensor values for the corresponding location under normal, non-hazard conditions, and one or more additional sets of reference sensor levels that correspond to expected sensor values for different hazard conditions. In such embodiments, each reference sensor level of a given set may correspond to, for example, a different measured parameter.

As described above with respect to FIG. 1, sensor measurements are taken using one or more sensor units 104. Each measurement is taken at a corresponding sensor location 204. To determine current hazard conditions, HM computing device 102 determines a location bin 202 that corresponds to each sensor location 204. For example, a first sensor location 206 is located within an area that corresponds to a first location bin 208, and accordingly, HM computing device 102 is configured to associate first sensor location 206 with first location bin 208. As such, to determine the current hazard condition, HM computing device 102 is configured to compare sensor measurements taken at first sensor location 206 with reference sensor levels associated with first location bin 208. For example, in some embodiments, HM computing device 102 may compare a temperature taken at first sensor location 206 to one or more reference temperature levels corresponding to first location bin 208, an electric field magnitude detected at first sensor location 206 to one or more reference electric field magnitude corresponding to first location bin 208, and so on with respect to other parameters. Based on the comparison, HM computing device 102 is configured to determine which hazard condition of a plurality of hazard conditions is present. For example, in some embodiments, if the sensor measurements at each sensor location 204 are within a threshold range of the corresponding non-hazard reference level for the associated location bin 202, HM computing device 102 determines that no abnormal hazard is present.

Figure 3:
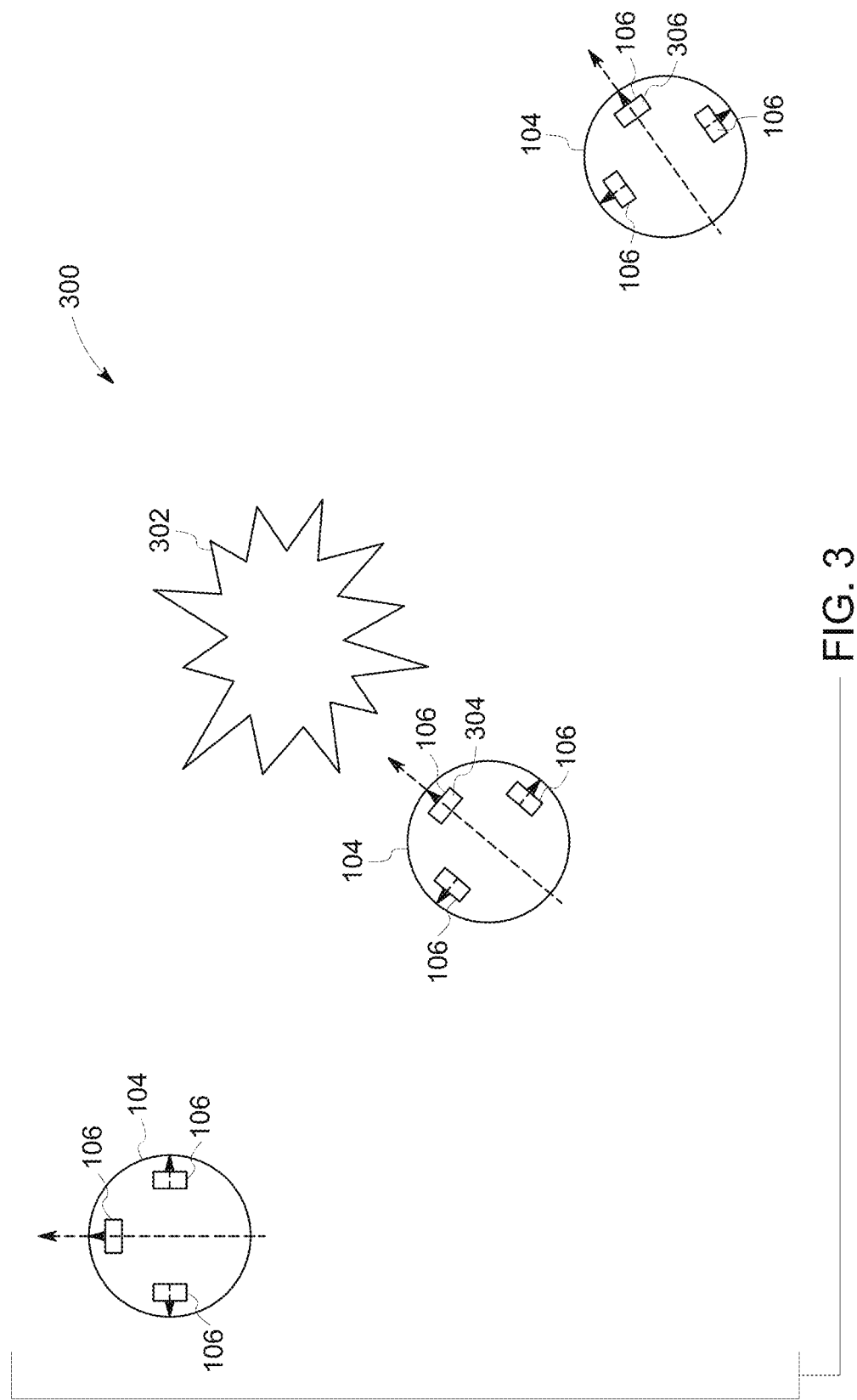
FIG. 3 is a plan view of an exemplary worksite in which the exemplary HM system shown in FIG. 1 is implemented.

FIG. 3 is a plan view of an exemplary worksite 300 in which HM system 100 (shown in FIG. 1) is implemented. Worksite 300 includes sensor units 104 including sensors 106, which generally function as described with respect to FIG. 1. In the example embodiment shown in FIG. 3, sensor units 104 are helmets worn by workers at worksite 300.

Worksite 300 includes a hazard source 302. Hazard source 302 may be, for example, a heat source such as a fire or overheating device, an electric field source, a source of fumes, or another source that results in effects detectable by sensors 106. Hazard source 302 generates effects in worksite 300 that may be measured or detected by sensors 106. For example, in embodiments where sensors 106 are electric field sensors, sensors 106 detect a specific electric field magnitude that depends on the location and orientation of sensor 106 with respect to hazard source 302. For example, a first sensor 304 that is located close to and oriented facing hazard source 302 may detect a relatively high electric field magnitude, while a second sensor 306 that is located farther away from and oriented perpendicular to hazard source 302 may detect a relatively low electric field magnitude.

Figure 4:
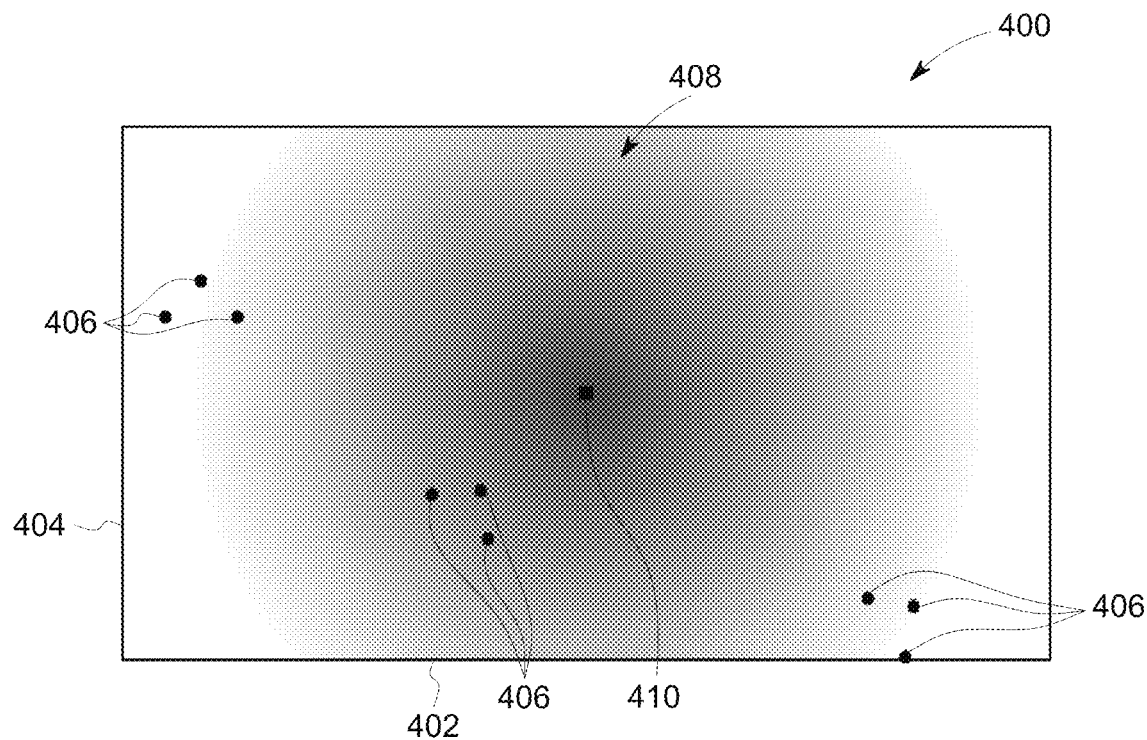
FIG. 4 is an exemplary hazard map representing a calculated magnitude of a hazard in the worksite illustrated in FIG. 3.

FIG. 4 is a hazard map 400 showing a calculated magnitude of a hazard in worksite 300 (shown in FIG. 3). For example, in some embodiments, hazard map 400 depicts an electric field magnitude, a temperature, or another parameter that can be measured in worksite 300 by sensors 106. In some embodiments, hazard map 400 is generated by HM computing device 102 (shown in FIG. 1). Hazard map 400 includes a horizontal axis 402 and a vertical axis 404 that correspond to a length along respective dimensions of worksite 300. For example, horizontal axis 402 may correspond to position in an east-west direction in meters or feet from a reference position, and vertical axis 404 may correspond to position in a north-south direction in meters or feet from a reference position.

Hazard map 400 further shows data points 406. Each data point 406 illustrates a position at which a measurement is taken with respect to horizontal axis 402 and vertical axis 404. While the locations of data points 406 correspond to the locations of sensors 106 shown in FIG. 3, in some embodiments, data points 406 are generated based on, for example, measurements from fewer sensors taken at different locations at different times. Each data point 406 also has a corresponding sensor measurement such as, for example, an electric field magnitude or temperature. As described with respect to FIG. 1, in some embodiments, HM computing device 102 is configured to use data points 406 to predict values that were not directly measured for the rest of worksite 300. Such predicted values are illustrated in FIG. 4 as a color gradient 408. Darker portions of color gradient 408 correspond to areas of greater magnitude values, while lighter portions of color gradient 408 correspond to areas of lesser magnitude values. A darkest portion of color gradient 408 is at a maximum value 410, which corresponds to hazard source 302 (shown in FIG. 3). For example, if hazard source 302 is an electric field source, an electric field magnitude will be greatest at maximum value 410. As such, the location of hazard 302 may be determined using map 400.

Figure 5:
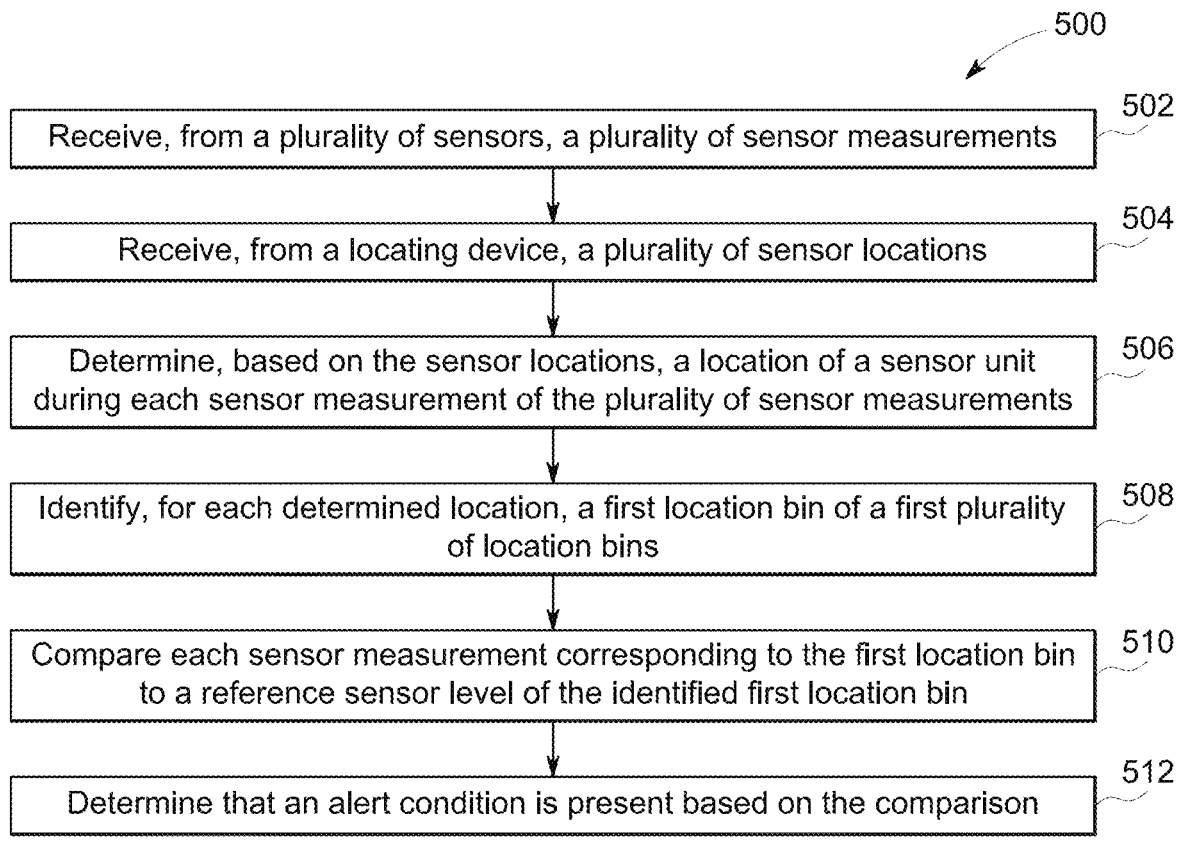
FIG. 5 is a flowchart of an exemplary method for mapping hazards.

FIG. 5 is a flowchart illustrating an exemplary method 500 for locating a hazard source. In some embodiments, method 500 is performed by HM system 100 (shown in FIG. 1), for example, using HM computing device 102.

Method 500 includes receiving 502, by at least one processor (such as processor 110) from the plurality of sensors (such as sensors 106), a plurality of sensor measurements. In some embodiments, the plurality of sensors is included in one or more sensor units (such as sensor unit 104). In some such embodiments, the sensor unit further includes a wearable device, wherein the plurality of sensors is configured to be attached to the wearable device. In some embodiments, the plurality of sensors includes one or more of a camera, a gas sensor, a temperature sensor, a humidity sensor, a voltage sensor, an electric field sensor, a sound sensor, a pressure sensor, or a biometric sensor. In some embodiments, each sensor measurement of the plurality of sensor measurements is generated at a different time.

Method 500 further includes receiving 504, by the at least one processor from a locating device (such as locating device 108), a plurality of sensor locations (such as sensor locations 204). In some embodiments, the sensor locations further correspond to a plurality of different locations.

Method 500 further includes determining 506, based on the sensor locations, a location of the sensor unit during each sensor measurement of the plurality of sensor measurements.

Method 500 further includes identifying 508, by the at least one processor, for each determined location, a first location identifier of a plurality of location identifiers (such as location bins 202).

Method 500 further includes comparing 510, by the at least one processor, each sensor measurement of each sensor location to the reference sensor level of the identified first location identifier.

Method 500 further includes determining 512, by the at least one processor, that an alert condition is present based on the comparison. In some embodiments, determining 512 that an alert condition is present includes determining that a difference between each sensor measurement of the plurality of sensor measurements and each corresponding reference sensor level is greater than a threshold difference. In some embodiments, the sensor unit further includes a loudspeaker attached to the wearable device, and method 500 further includes causing, by the at least one processor, the loudspeaker to generate an audio notification based on the determination that an alert condition is present. Alternatively, other suitable alerts (e.g., visual alerts or vibratory haptic feedback) may be generated in response to detecting an alert condition.

In some embodiments, method 500 further includes identifying, for each sensor location, a second location identifier of a second plurality of location identifiers, and determining that one of a first reference map or a second reference map corresponds to the received plurality of sensor measurements by comparing each sensor measurement of each sensor location to the reference sensor level of the identified second location identifier. In some such embodiments, method 500 further includes determining a current hazard condition of a plurality of hazard conditions based on the determination that one of the first reference map or the second reference map corresponds to the received plurality of sensor measurements. In some such embodiments, determining that one of the first reference map or the second reference map corresponds to the received plurality of sensor measurements includes determining that a difference between each sensor measurement of the plurality of sensor measurements and each corresponding reference sensor level is less than a threshold difference.

In some embodiments, method 500 further includes retrieving, by the at least one processor from the at least one memory device, a plurality of historical sensor measurements, generating, by the at least one processor, the reference map based on the plurality of historical sensor measurements, and storing, by the at least one processor, the generated reference map in the at least one memory device.

An exemplary technical effect of the methods, systems, and apparatus described herein includes at least one of: (a) establishing a set of reference sensor levels by aggregating historical sensor measurements at corresponding locations within a worksite; (b) determining hazard conditions are present by comparing current sensor measurements with reference sensor levels for locations within a worksite; (c) generating a map that displays potential hazard locations within a worksite based on sensor measurements taken using wearable sensor devices at different locations within the worksite; (d) determining the intensity of a hazard at an unmeasured location of a worksite by interpolating or extrapolating data derived from a plurality of sensor measurements taken within the worksite; (e) determining a current hazard configuration and associated hazards by comparing current sensor measurements to one or more reference maps including reference data corresponding to different potential hazards; and (0 generating hazard alerts for individuals in a worksite indicating the type and location of a hazard based on a determination that a hazard is present by comparing current sensor measurements to reference sensor levels.

Exemplary embodiments of a system for mapping hazards within a site are provided herein. The systems and methods of operating and manufacturing such systems and devices are not limited to the specific embodiments described herein, but rather, components of systems and/or steps of the methods may be utilized independently and separately from other components and/or steps described herein. For example, the methods may also be used in combination with other electronic systems, and are not limited to practice with only the electronic systems, and methods as described herein. Rather, the exemplary embodiment can be implemented and utilized in connection with many other electronic systems.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for detecting and mapping hazards comprising:
    at least one sensor unit comprising a plurality of sensors and a locating device; and
    a hazard mapping (HM) computing device comprising:
        at least one memory device configured to store a first reference map and a second reference map, the first reference map including a first plurality of location identifiers and at least one reference sensor level associated with each location identifier, the second reference map including a second plurality of location identifiers and at least one reference sensor level associated with each location identifier of the second plurality of location identifiers; and
        at least one processor configured to communicate with said at least one memory device and said at least one sensor unit, wherein said at least one processor is configured to:
            receive, from said plurality of sensors, a plurality of sensor measurements;
            receive, from said locating device, a plurality of sensor locations;
            determine, based on the sensor locations, a location of said sensor unit during each sensor measurement of the plurality of sensor measurements;
            identify, for each determined location, a first location identifier of the first plurality of location identifiers;
            compare each sensor measurement corresponding to the first location identifier to the reference sensor level of the identified first location identifier;
            determine that an alert condition is present based on the comparison;
            identify, for each sensor location, a second location identifier of the second plurality of location identifiers; and
            determine that one of the first reference map and the second reference map corresponds to the received plurality of sensor measurements by comparing each sensor measurement of each sensor location to the reference sensor level of the identified second location identifier.

2. The system of claim 1, wherein said at least one processor is further configured to determine a current hazard condition based on the determination that one of the first reference map and the second reference map corresponds to the received plurality of sensor measurements.

3. The system of claim 1, wherein to determine that one of the first reference map and the second reference map corresponds to the received plurality of sensor measurements, said at least one processor is configured to determine that a difference between each sensor measurement of the plurality of sensor measurements and each corresponding reference sensor level is less than a threshold difference.

4. The system of claim 1, wherein to determine that an alert condition is present, said at least one processor is configured to determine that a difference between each sensor measurement of the plurality of sensor measurements and each corresponding reference sensor level is greater than a threshold difference.

5. The system of claim 1, wherein said at least one sensor unit further comprises a wearable device, and wherein said plurality of sensors are configured to be attached to said wearable device.

6. The system of claim 5, wherein said at least one sensor unit further comprises a loudspeaker attached to said wearable device, and wherein said at least one processor is further configured to cause said loudspeaker to generate an audio notification based on the determination that an alert condition is present.

7. The system of claim 1, wherein said plurality of sensors includes at least one of a camera, a gas sensor, a temperature sensor, a humidity sensor, a voltage sensor, an electric field sensor, a sound sensor, a pressure sensor, and a biometric sensor.

8. The system of claim 1, wherein the sensor locations corresponding to each sensor measurement of the plurality of sensor measurements are a plurality of different locations.

9. The system of claim 1, wherein each sensor measurement of the plurality of sensor measurements is generated at a different time.

10. The system of claim 1, wherein said at least one processor is further configured to:
    retrieve, from said at least one memory device, a plurality of historical sensor measurements;
    generate the first reference map based on the plurality of historical sensor measurements; and
    store the generated first reference map in the at least one memory device.

11. A method for detecting and mapping hazards, said method performed by a hazard mapping (HM) computing device including at least one processor coupled to at least one memory device and at least one sensor unit including a plurality of sensors and a locating device, the at least one memory device configured to store a first reference map and a second reference map, the first reference map including a first plurality of location identifiers and at least one reference sensor level associated with each location identifier, the second reference map including a second plurality of location identifiers and at least one reference sensor level associated with each location identifier of the second plurality of location identifiers, said method comprising:
    receiving, by the at least one processor from the plurality of sensors, a plurality of sensor measurements;
    receiving, by the at least one processor from the locating device, a plurality of sensor locations;
    determining, by the at least one processor, based on the sensor locations, a location of the sensor unit during each sensor measurement of the plurality of sensor measurements;
    identifying, by the at least one processor, for each determined location, a first location identifier of the first plurality of location identifiers;
    comparing, by the at least one processor, each sensor measurement corresponding to the first location identifier to the reference sensor level of the identified first location identifier;

determining, by the at least one processor, that an alert condition is present based on the comparison;

identifying, by the at least one processor, for each sensor location, a second location identifier of the second plurality of location identifiers; and determining, by the at least one processor, that one of the first reference map and the second reference map corresponds to the received plurality of sensor measurements by comparing each sensor measurement of each sensor location to the reference sensor level of the identified second location identifier.

12. The method of claim 11, wherein said method further comprises determining, by the at least one processor, a current hazard condition based on the determination that one of the first reference map and the second reference map corresponds to the received plurality of sensor measurements.

13. The method of claim 11, wherein determining that one of the first reference map and the second reference map corresponds to the received plurality of sensor measurements comprises determining, by the at least one processor, that a difference between each sensor measurement of the plurality of sensor measurements and each corresponding reference sensor level is less than a threshold difference.

14. The method of claim 11, wherein determining that an alert condition is present comprises determining, by the at least one processor, that a difference between each sensor measurement of the plurality of sensor measurements and each corresponding reference sensor level is greater than a threshold difference.

15. The method of claim 11, further comprising:
retrieving, by the at least one processor from the at least one memory device, a plurality of historical sensor measurements;
generating, by the at least one processor, the first reference map based on the plurality of historical sensor measurements; and
storing, by the at least one processor, the generated first reference map in the at least one memory device.

16. A hazard mapping (HM) computing device comprising at least one processor and at least one memory device, said processor coupled to said at least one memory device, said processor configured to communicate with at least one sensor unit including a plurality of sensors and a locating device, said at least one memory device configured to store a first reference map and a second reference map, the first reference map including a first plurality of location identifiers and at least one reference sensor level associated with each location identifier, the second reference map including a second plurality of location identifiers and at least one reference sensor level associated with each location identifier of the second plurality of location identifiers, and wherein said at least one processor is further configured to:

receive, from the plurality of sensors, a plurality of sensor measurements;

receive, from the locating device, a plurality of sensor locations;

determine, based on the sensor locations, a location of said sensor unit during each sensor measurement of the plurality of sensor measurements;

identify, for each determined location, a first location identifier of the first plurality of location identifiers;

compare each sensor measurement corresponding to the first location identifier to the reference sensor level of the identified first location identifier;

determine that an alert condition is present based on the comparison;

identify, for each sensor location, a second location identifier of the second plurality of location identifiers; and determine that one of the first reference map and the second reference map corresponds to the received plurality of sensor measurements by comparing each sensor measurement of each sensor location to the reference sensor level of the identified second location identifier.

17. The HM computing device of claim 16, wherein said at least one processor is further configured to determine a current hazard condition based on the determination that one of the first reference map and the second reference map corresponds to the received plurality of sensor measurements.

* * * * *

UNITED STATES PATENT AND TRADEMARK OFFICE
CERTIFICATE OF CORRECTION

| | | |
|---|---|---|
| PATENT NO. | : 11,302,170 B1 | Page 1 of 1 |
| APPLICATION NO. | : 16/952393 | |
| DATED | : April 12, 2022 | |
| INVENTOR(S) | : Lembit Salasoo et al. | |

It is certified that error appears in the above-identified patent and that said Letters Patent is hereby corrected as shown below:

On the Title Page

Item [72], delete "S M Shajedul Hasan" and insert therefor -- SM Shajedul Hasan --.

In the Specification

Column 10, Line 28, delete "and (0 generating" and insert therefor -- and (f) generating --.

Signed and Sealed this
Fourteenth Day of June, 2022

Katherine Kelly Vidal
*Director of the United States Patent and Trademark Office*